(12) United States Patent
Suzuki (10) Patent No.: US 8,206,789 B2
(45) Date of Patent: Jun. 26, 2012

(54) GLASS SUBSTRATES AND METHODS OF ANNEALING THE SAME

(75) Inventor: Shoji Suzuki, San Jose, CA (US)

(73) Assignee: WD Media, Inc., San Jose, CA (US)

( * ) Notice: Subject to any disclaimer, the term of this patent is extended or adjusted under 35 U.S.C. 154(b) by 46 days.

(21) Appl. No.: 12/611,827

(22) Filed: Nov. 3, 2009

(65) Prior Publication Data

US 2011/0104427 A1  May 5, 2011

(51) Int. Cl.
- *B32B 3/02* (2006.01)
- *B05D 1/12* (2006.01)
- *G11B 5/82* (2006.01)

(52) U.S. Cl. ............. 427/355; 427/180; 428/846.9; 428/848.8; 65/111

(58) Field of Classification Search ............. 427/527, 427/516, 567, 568, 595, 199, 213.3, 213.31, 427/215, 372.2, 180, 397.7, 355, 140; 428/846.9, 428/323, 404, 141, 848.8, 64.2; 524/265; 359/3; 65/111, 59.7, 60.5; 247/42; 252/186.33; 510/276; 106/287.23; 523/118; 502/439; 435/5; 257/42
See application file for complete search history.

(56) References Cited

U.S. PATENT DOCUMENTS

| | | | |
|---|---|---|---|
| 5,576,282 A * | 11/1996 | Miracle et al. ............. 510/276 |
| 5,654,057 A | 8/1997 | Kitayama et al. |
| 5,681,609 A | 10/1997 | Kitayama et al. |
| 5,686,014 A * | 11/1997 | Baillely et al. ............ 252/186.33 |
| 5,733,622 A | 3/1998 | Starcke et al. |
| 5,910,371 A | 6/1999 | Francel et al. |
| 5,916,656 A | 6/1999 | Kitayama et al. |
| 6,363,599 B1 | 4/2002 | Bajorek |
| 6,374,640 B1 * | 4/2002 | Fotheringham et al. ........ 65/111 |
| 6,395,634 B1 | 5/2002 | Miyamoto |
| 6,801,397 B2 | 10/2004 | Yamamoto et al. |
| 6,908,870 B2 | 6/2005 | Kawai |
| 7,001,669 B2 | 2/2006 | Lu et al. |
| 7,040,953 B2 | 5/2006 | Matsuno et al. |
| 2001/0029752 A1 * | 10/2001 | Natan et al. ............. 65/59.7 |
| 2002/0022682 A1 * | 2/2002 | Wallace et al. ............ 524/265 |
| 2002/0176982 A1 * | 11/2002 | Rohrbaugh et al. ......... 428/323 |
| 2003/0077982 A1 | 4/2003 | Takizawa |
| 2003/0096078 A1 | 5/2003 | Horisaka et al. |
| 2003/0228415 A1 * | 12/2003 | Bi et al. ............. 427/180 |
| 2004/0092396 A1 * | 5/2004 | Glazer et al. ............. 502/439 |
| 2005/0096210 A1 | 5/2005 | Kawai |
| 2005/0223744 A1 | 10/2005 | Horisaka et al. |
| 2006/0286550 A1 * | 12/2006 | Montagu et al. ............ 435/5 |
| 2007/0039353 A1 | 2/2007 | Kamiya |
| 2007/0104922 A1 * | 5/2007 | Zhai et al. ............. 428/141 |
| 2007/0142498 A1 * | 6/2007 | Brennan et al. ............ 523/118 |
| 2007/0178305 A1 * | 8/2007 | Papazoglou ............. 427/140 |

(Continued)

FOREIGN PATENT DOCUMENTS

JP  H02-301017  12/1990

*Primary Examiner* — Kevin M. Bernatz
*Assistant Examiner* — Louis Falasco (57) ABSTRACT

A method for forming a glass substrate comprises the steps of forming a glass blank with opposing substantially planar surfaces and at least one edge, coating the glass blank in silica-alumina nanoparticles, the silica-alumina nanoparticles comprising an inner core of silica with an outer shell of alumina, annealing the coated glass blank to form a conformal coating of silica-alumina around the glass blank, and polishing the coated glass blank to remove the conformal coating of silica-alumina from the opposing substantially planar surfaces thereof.

18 Claims, 6 Drawing Sheets

U.S. PATENT DOCUMENTS

| | | | |
|---|---|---|---|
| 2007/0238174 A1* | 10/2007 | Cousins et al. | 435/375 |
| 2008/0028986 A1* | 2/2008 | Futterer et al. | 106/287.23 |
| 2008/0043301 A1* | 2/2008 | Lewis | 359/3 |
| 2008/0085412 A1* | 4/2008 | Ortiz | 428/404 |
| 2009/0057661 A1* | 3/2009 | Siddiqui et al. | 257/42 |
| 2009/0098366 A1* | 4/2009 | Smoukov et al. | 428/323 |
| 2009/0104369 A1 | 4/2009 | Rajala et al. | |
| 2009/0252993 A1* | 10/2009 | Kawai et al. | 428/846.9 |

* cited by examiner

FIG. 10

GLASS SUBSTRATES AND METHODS OF ANNEALING THE SAME

FIELD OF THE INVENTION

The present invention generally relates to hard disk drives and, in particular, relates to glass substrates for hard disk drives and methods of annealing the same.

BACKGROUND OF THE INVENTION

Glass substrates are frequently used in the fabrication of information storage media, such as magnetic recording media for hard disk drives. Glass substrates enjoy a number of advantages when compared with substrates formed from aluminum alloys, which may be prone to deformation.

Because the information storage media may be rotated at high speeds, the substrate on which it is disposed must have sufficient mechanical strength to withstand the forces generated by this rotation. One approach to strengthening glass substrates involves chemically strengthening the glass thereof, by exchanging sodium ions near the surface of the substrate with larger potassium ions in order to provide a compressive stress, which offsets tensile stress and improves the toughness of the glass.

Figure 1:
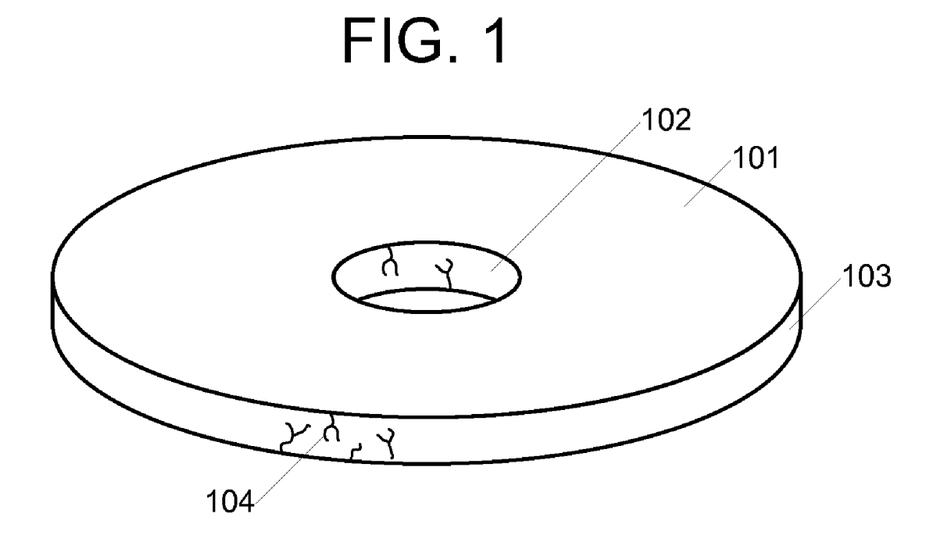
FIG. 1 illustrates a glass substrate with cracks along the inside and outside edges thereof.

This chemical strengthening, however, does not address a fundamental limitation to the mechanical strength of glass, which arises due to cracks formed in the glass when the substrate is manufactured (e.g., cracks formed by scribing the inner and outer diameter of an annuls-shaped substrate). When stressed, these cracks can initiate a breakage that can propagate through a large region of the substrate, causing catastrophic failure of the information storage medium formed thereon. Such cracks are depicted in the glass substrate 101 illustrated in FIG. 1. As can be seen with reference to FIG. 1, substrate 101 is an annulus with opposing substantially planar surfaces, an inner edge 102 and an outer edge 103. On both edges 102 and 103 are disposed a number of cracks 104. These cracks may have resulted, for example, from a process of forming substrate 101, including scribing, grinding, cutting or polishing. Left untreated, these cracks may initiate a breakage when substrate 101 is subjected to mechanical stresses such as may be caused by high speed rotation.

SUMMARY OF THE INVENTION

Various embodiments of the present invention solve the foregoing problem by providing methods for forming glass substrates with greater resistance to breakage caused by cracks.

According to one embodiment of the present invention, a method for forming a glass substrate comprises the steps of forming a glass blank with opposing substantially planar surfaces and at least one edge, coating the glass blank in silica-alumina nanoparticles, the silica-alumina nanoparticles comprising an inner core of silica with an outer shell of alumina, annealing the coated glass blank to form a conformal coating of silica-alumina around the glass blank, and polishing the coated glass blank to remove the conformal coating of silica-alumina from the opposing substantially planar surfaces thereof.

According to another embodiment of the present invention, a method for forming a plurality of glass substrates comprises the steps of forming a plurality of glass blanks, each glass blank having opposing substantially planar surfaces and at least one edge, coating the plurality of glass blanks in silica-alumina nanoparticles, the silica-alumina nanoparticles comprising an inner core of silica with an outer shell of alumina, stacking the plurality of coated glass blanks directly upon one another, annealing the stacked plurality of coated glass blanks to form a conformal coating of silica-alumina around each glass blank, and polishing each glass blank to remove the conformal coating of silica-alumina from the opposing substantially planar surfaces thereof.

According to yet another embodiment of the present invention, a glass substrate comprises a glass structure with opposing substantially planar surfaces and at least one edge, wherein the at least one edge is coated with a conformal layer of silica-alumina nanoparticles, the silica-alumina nanoparticles comprising an inner core of silica with an outer shell of alumina.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

One approach to strengthening glass substrates involves coating the surfaces thereof with silica particles. Since the surface of the glass substrate is also primarily silica, both the particles and the surface have the same charge (i.e., a negative charge). Accordingly, evenly dispersing the particles over the surface requires a mechanical dispersion technique, which may not provide an acceptable level of smoothness and/or evenness.

Therefore, in accordance with one aspect of the subject disclosure, positively-charged nanoparticles are used to coat a glass substrate. Because of the different charge between the nanoparticles and the surface of the glass substrate, the dispersion of the nanoparticles is easily accomplished by, for example, dipping a glass substrate in a solution/colloidal suspension of the positively-charged nanoparticles.

Figure 2:
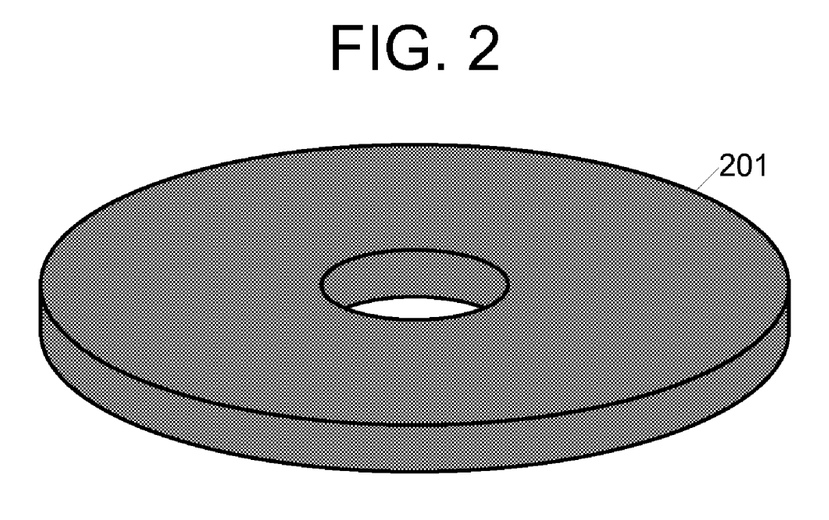
FIG. 2 illustrates a glass substrate coated with silica-alumina nanoparticles in accordance with one aspect of the subject disclosure.

According to one aspect of the subject disclosure, silica-alumina nanoparticles may be used to coat the surfaces of a glass substrate. According to one aspect of the subject disclosure, nanoparticles comprising inner core of silica with an outer shell of alumina may be used in this application. For example, one such commercially-available colloidal suspension of silica-alumina nanoparticles is the LUDOX® CL colloidal suspension of $SiO_2$ and $Al_2O_3$ manufactured by W.R. Grace & Co. Using such positively-charged nanoparticles with a diameter of less than about 50 nm (or even less than about 20 nm) allows the nanoparticles to more easily penetrate into micro-cracks in the glass substrate (e.g., without any additional mechanical dispersion). FIG. 2 illustrates substrate 101 after being coated with a layer 201 of nanoparticles (e.g., following an operation in which substrate 101 is soaked in a solution or colloidal suspension of such nanoparticles).

While commercially-available preparations of silica-alumina nanoparticles are available in a variety of concentrations, it may be preferable to dilute the solutions to a weight concentration of between about 0.01 weight percent and 0.30 weight percent silica-alumina nanoparticles before immersing a glass substrate therein, according to one aspect of the subject disclosure. According to another aspect of the subject disclosure, a colloidal suspension of silica-alumina nanoparticles may be diluted to a concentration of between about 0.08 weight percent and 0.10 weight percent silica-alumina nanoparticles before soaking a glass substrate therein. These ranges of concentration has been determined to facilitate better crack penetration and more even coatings. The soaking operation may be timed to provide a conformal layer of silica-alumina nanoparticles less than about 1 micron thick around the glass substrate.

Figure 3:
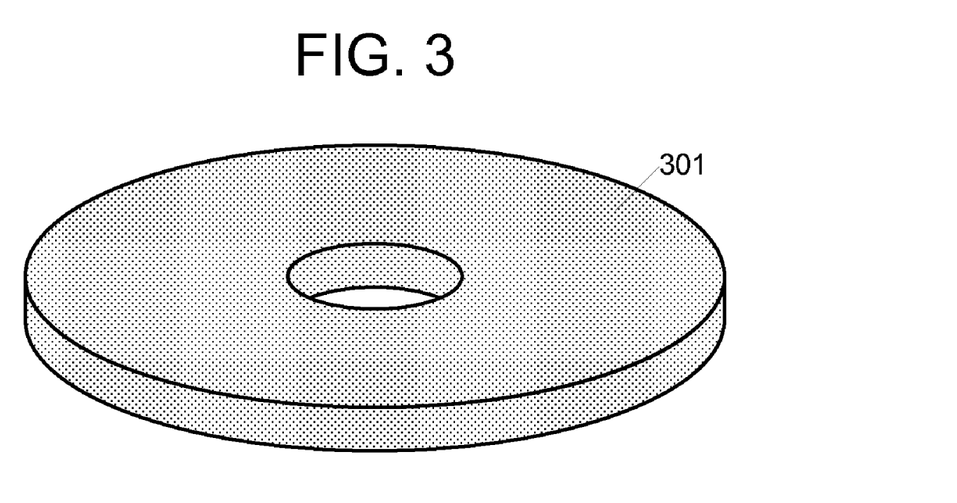
FIG. 3 illustrates a glass substrate with a conformal coating of silica-alumina in accordance with one aspect of the subject disclosure.
Figure 4:
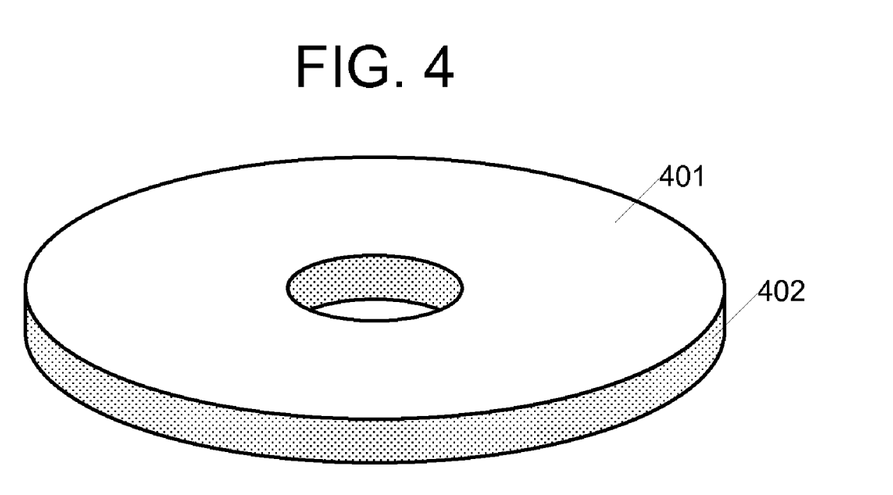
FIG. 4 illustrates a glass substrate with a conformal coating of silica-alumina along the inside and outside edges thereof, in accordance with one aspect of the subject disclosure.

To adhere the nanoparticles to the substrate, an annealing step may be performed after dispersing the particles on the substrate surface, in accordance with one aspect of the subject disclosure. The high temperature of the annealing process helps to adhere the nanoparticles to the surfaces of the glass substrate and to seal the micro cracks therein. According to one aspect of the subject disclosure, the annealing step may comprise heating the coated substrate to a temperature at or above a glass transition temperature thereof, for a period ranging from about 0.5 to about 10 hours. For example, for a borosilicate glass substrate with a glass transition temperature of 525° C., the annealing step may involve soaking the substrate at an annealing temperature of 560° C. for a period of 5 to 8 hours. FIG. 3 illustrates substrate 101 after the nanoparticles have been annealed to form a conformal coating 301 of silica-alumina.

Because it may not be desirable to have alumina particles, such as the nuclei of the silica-alumina nanoparticles, on a planar surface of the glass substrate (e.g., as those surfaces may be subsequently coated with one or more layers for magnetic recording), in accordance with one aspect of the subject disclosure, a polishing process may be performed after annealing to remove the nanoparticles from the opposing surfaces of the substrate. The nanoparticles on the inner and outer edges, however, remain on the glass substrate, providing a conformal coating less than about 1 micron thick that penetrates into any micro-cracks on these edges. The coating may remain on the substrate even into a final product (e.g., a recording media) without any adverse effect on the properties thereof. For example, in accordance with one aspect of the subject disclosure, a magnetic recording media comprising the glass substrate thus produced may enjoy improved strength (e.g., due to the coating on the inner and outer edges thereof) without any degradation of the magnetic properties thereof, and without compromising the function of a hard disk drive comprising the magnetic recording media.

According to one aspect of the subject disclosure, the step of polishing the opposing substantially planar surfaces of the glass substrate may comprise removing between about 5 and 50 microns of material from each of the opposing surfaces (e.g., removing both the conformal coating of nanoparticles and some portion of the substrate material).

Figure 5:
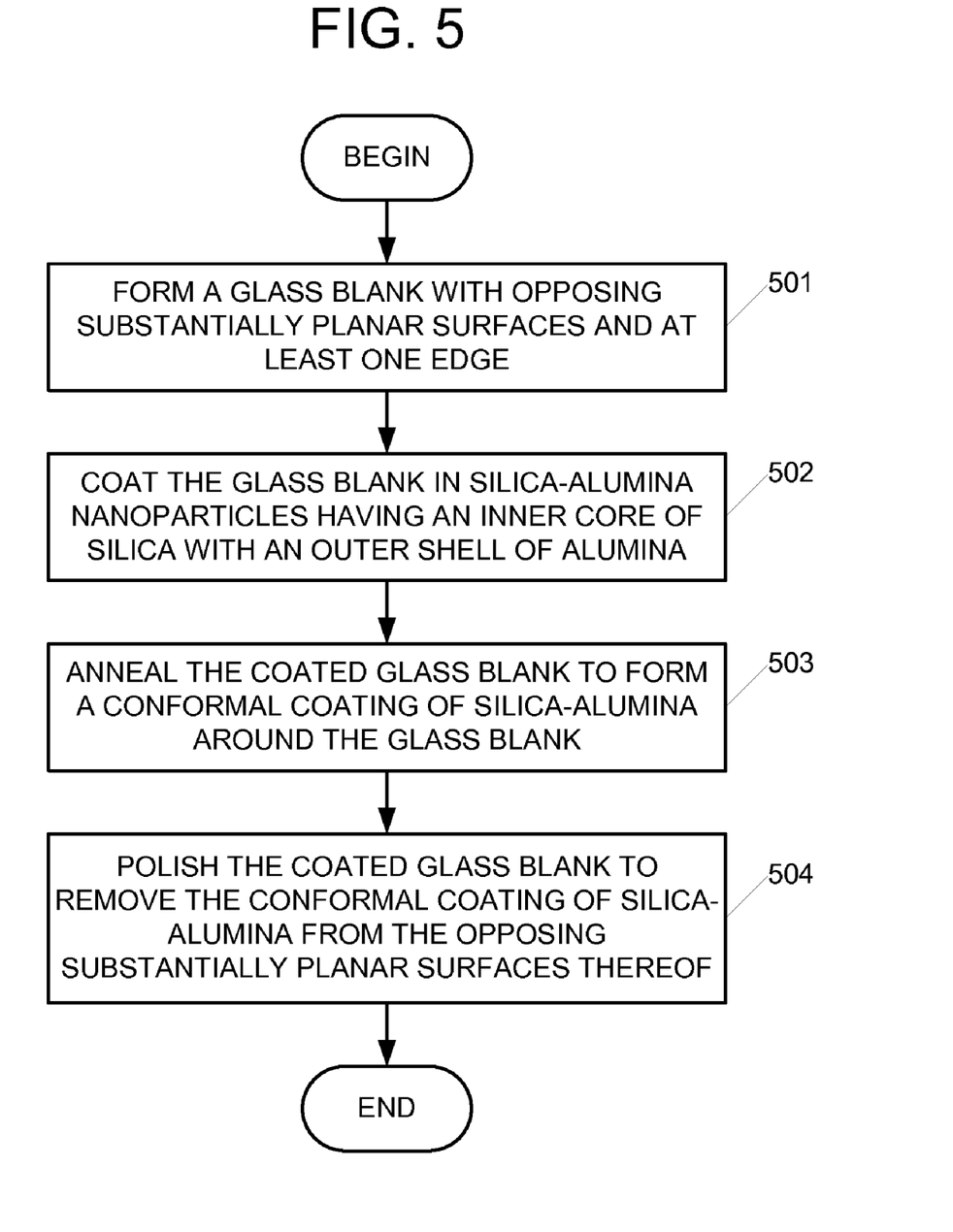
FIG. 5 is a flow chart illustrating a method of forming a glass substrate in accordance with one aspect of the subject disclosure.

FIG. 5 is a flow chart illustrating a method of forming a glass substrate in accordance with one aspect of the subject disclosure. The method begins with step 501, in which a glass blank with opposing substantially planar surfaces and at least one edge is formed. In step 502, the glass blank is coated in silica-alumina nanoparticles. The silica-alumina nanoparticles each comprise an inner core of silica with an outer shell of alumina. In step 503, the coated glass blank is annealed to form a conformal coating of silica-alumina around the glass blank. The coated glass blank is polished in step 504 to remove the conformal coating of silica-alumina from the opposing substantially planar surfaces thereof.

Figure 6:
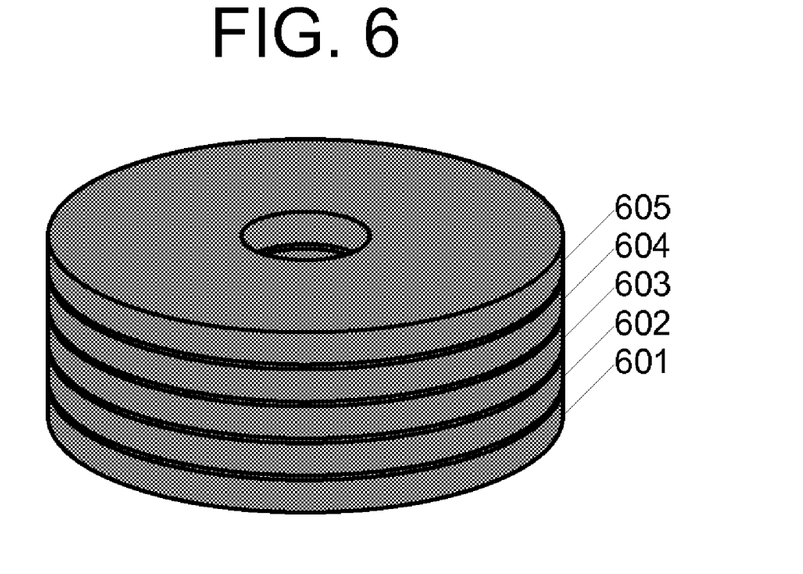
FIG. 6 illustrates a stack of glass substrates coated with silica-alumina nanoparticles in accordance with one aspect of the subject disclosure.
Figure 7:
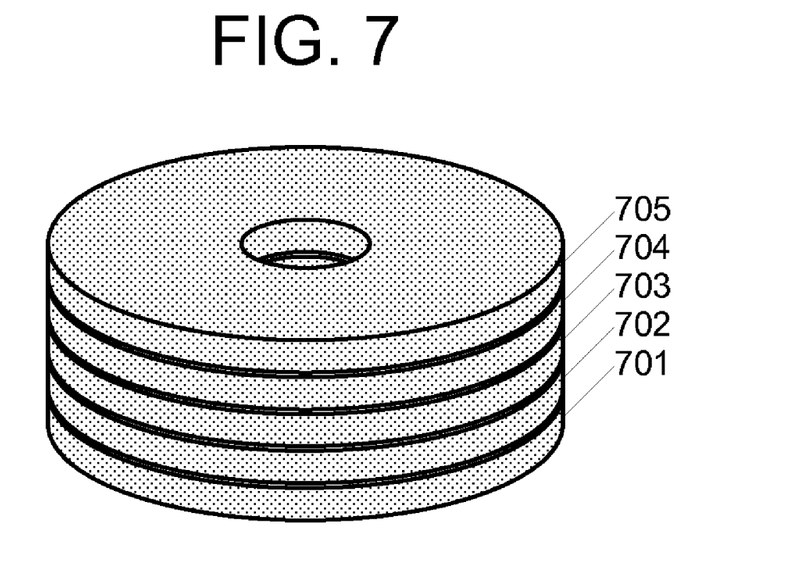
FIG. 7 illustrates a stack of glass substrates with a conformal coating of silica-alumina in accordance with one aspect of the subject disclosure.

One benefit of deferring the polishing of the planar surfaces of the substrate until after the annealing step is that the layer of nanoparticles on the planar surfaces prevent substrates from sticking to one another when stacked, without the need for a separator between them. This effect can be exploited to allow a stack of coated substrates to be annealed in a single operation. As an additional benefit, the pressure exerted by stacked substrates upon one another during annealing may beneficially increase the flatness thereof. In this regard, in accordance with one aspect of the subject disclosure, additional weight may also be placed on top of one or more substrates during the annealing process to further increase the flatness thereof. In this regard, FIG. 6 illustrates a stack of glass substrates 601-605 that have been coated with silica-alumina nanoparticles in accordance with one aspect of the subject disclosure. FIG. 7 illustrates a stack of glass substrates 701-705 after the coating of nanoparticles around each substrate has been annealed into a conformal coating of silica-alumina in accordance with one aspect of the subject disclosure.

Figure 8:
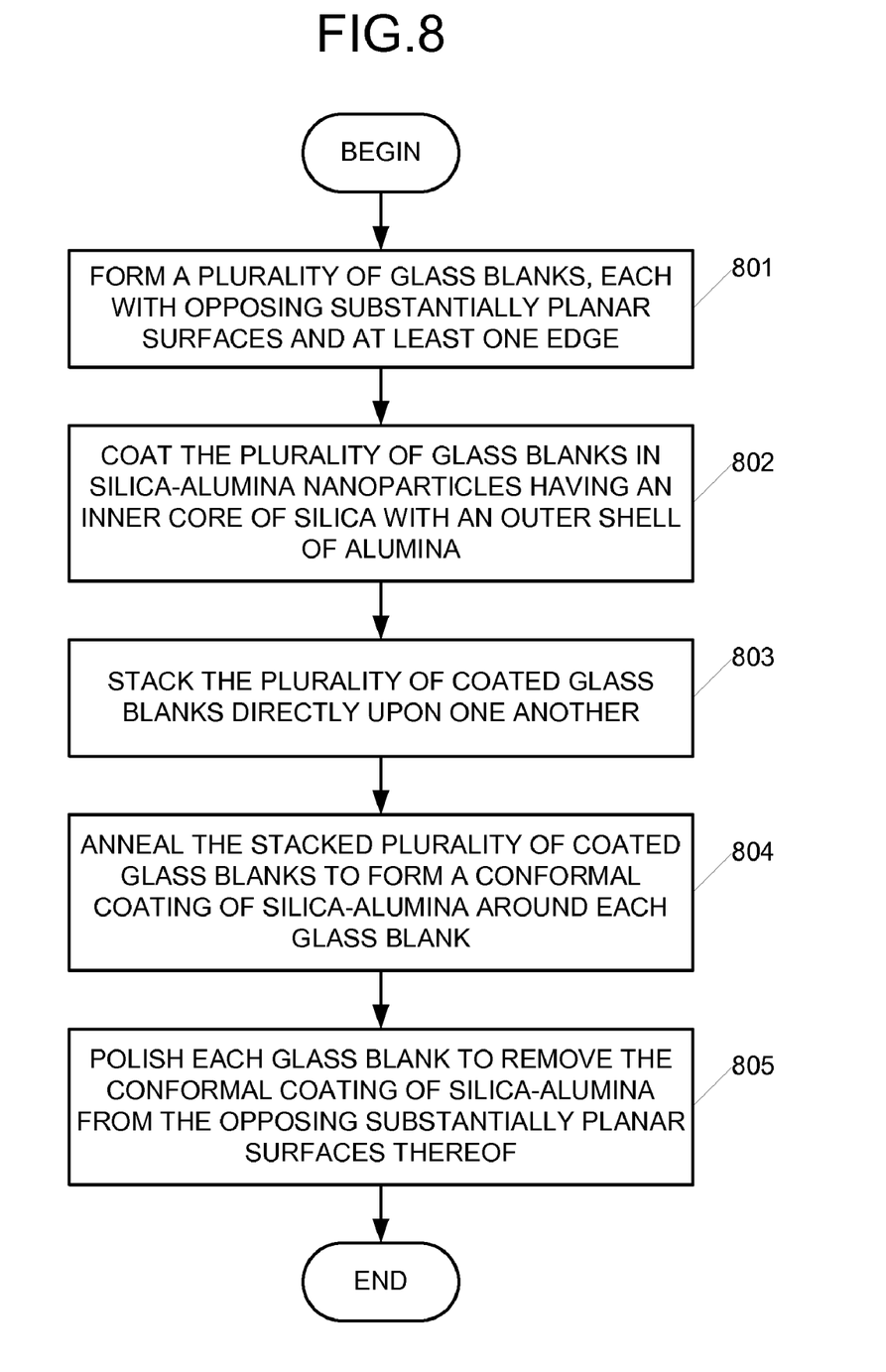
FIG. 8 is a flow chart illustrating a method of forming glass substrates in accordance with one aspect of the subject disclosure.

FIG. 8 is a flow chart illustrating a method of forming glass substrates in accordance with one aspect of the subject disclosure. The method begins with step 801, in which a plurality of glass blanks is formed. Each glass blank has opposing substantially planar surfaces and at least one edge. In step 802, the plurality of glass blanks are coated in silica-alumina nanoparticles. The silica-alumina nanoparticles comprise an inner core of silica with an outer shell of alumina. The plurality of coated glass blanks are stacked directly upon one another in step 803, and in step 804, the stacked plurality of coated glass blanks are annealed to form a conformal coating of silica-alumina around each glass blank. In step 805, each glass blank is polished to remove the conformal coating of silica-alumina from the opposing substantially planar surfaces thereof.

Figure 9:
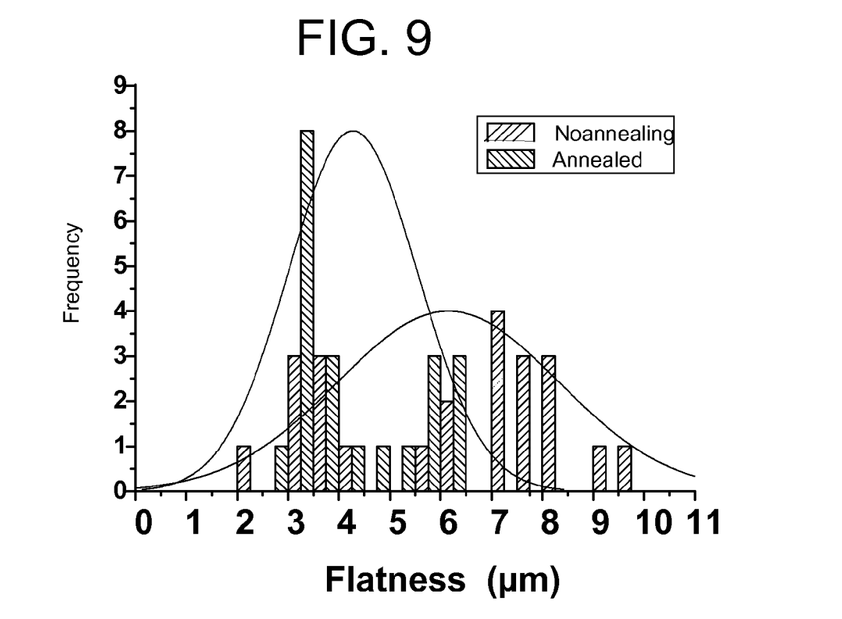
FIG. 9 is a graph illustrating a performance benefit with respect to flatness enjoyed by a glass substrate in accordance with one aspect of the subject disclosure.
Figure 10:
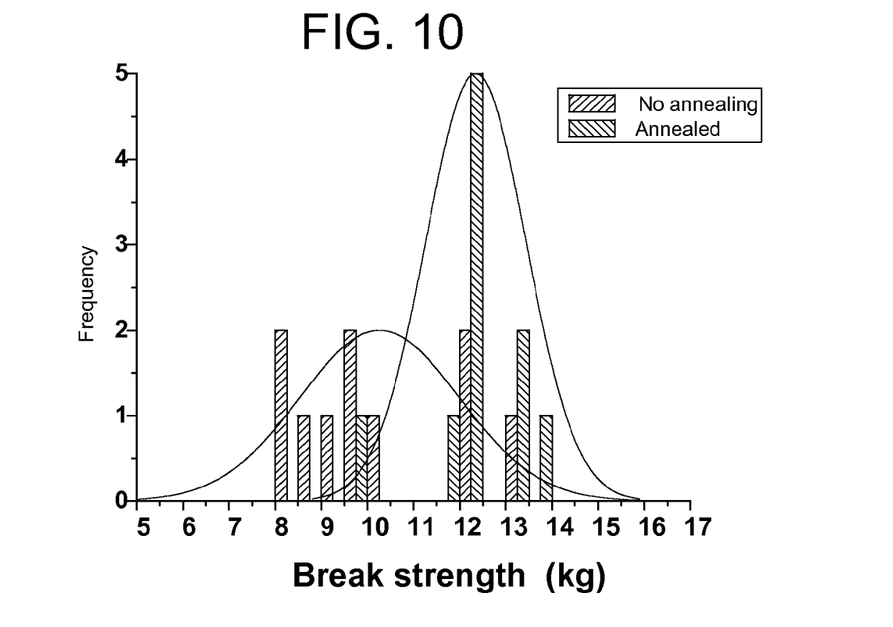
FIG. 10 is a graph illustrating a performance benefit with respect to break strength enjoyed by a glass substrate in accordance with one aspect of the subject disclosure.

FIG. 9 is a graph illustrating a performance benefit with respect to flatness enjoyed by a glass substrate in accordance with one aspect of the subject disclosure. As can be seen with respect to FIG. 9, a glass substrate that is coated with nano-particles, annealed and polished enjoys substantially flatter surfaces than does a glass substrate not so processed. Similarly, FIG. 10 is a graph illustrating a performance benefit with respect to break strength enjoyed by a glass substrate in accordance with one aspect of the subject disclosure. As can be seen with respect to FIG. 10, a glass substrate that is coated with nano-particles, annealed and polished enjoys substantially greater break strength than does a glass substrate not so processed.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for forming a glass substrate, comprising the steps of:
    forming a glass blank with opposing substantially planar surfaces and at least one edge;
    coating the glass blank in silica-alumina nanoparticles, the silica-alumina nanoparticles comprising an inner core of silica with an outer shell of alumina;
    annealing the coated glass blank to form a conformal coating of silica-alumina around the glass blank; and
    polishing the coated glass blank to remove the conformal coating of silica-alumina from the opposing substantially planar surfaces thereof and to remove a portion of the glass substrate from each of the opposing substantially planar surfaces.

2. The method according to claim 1, wherein the step of coating the glass blank in the silica-alumina nanoparticles comprises soaking the glass blank in a colloidal suspension comprising the silica-alumina nanoparticles.

3. The method according to claim 2, wherein the colloidal suspension has a concentration of between about 0.01 weight percent and 0.30 weight percent silica-alumina nanoparticles.

4. The method according to claim 2, wherein the colloidal suspension has a concentration of between about 0.08 weight percent and 0.10 weight percent silica-alumina nanoparticles.

5. The method according to claim 1, wherein the silica-alumina nanoparticles adhere to the glass blank due to a charge difference between the silica-alumina nanoparticles and the glass blank.

6. The method according to claim 1, wherein the step of coating the glass blank in the silica-alumina nanoparticles comprises forming a conformal layer of the silica-alumina nanoparticles less than about 1 micron around the glass blank.

7. The method according to claim 1, wherein the silica-alumina nanoparticles have an average diameter of less than about 50 nm.

8. The method according to claim 1, wherein the silica-alumina nanoparticles have an average diameter of less than about 20 nm.

9. The method according to claim 1, wherein the step of annealing the coated glass blank comprises heating the coated glass blank to a temperature at or above a glass transition temperature of the coated glass blank.

10. The method according to claim 9, wherein the step of annealing the coated glass blank further comprises maintaining the coated glass blank at a temperature at or above a glass transition temperature of the coated glass blank for between about 0.5 and 10 hours.

11. The method according to claim 1, wherein the step of annealing the coated glass blank comprises stacking a second coated glass blank directly upon the coated glass blank, and wherein the silica-alumina nanoparticles prevent the coated glass blank from fusing to the second coated glass blank.

12. The method according to claim 11, wherein pressure exerted by the second coated glass blank upon the coated glass blank helps to flatten one of the opposing substantially planar surfaces of the coated glass blank.

13. The method according to claim 1, wherein the step of annealing the coated glass blank comprises stacking a weight upon the coated glass blank to flatten one of the opposing substantially planar surfaces of the coated glass blank.

14. The method according to claim 1, wherein the portion removed from each of the opposing substantially planar surfaces is between about 5 and 50 microns thick.

15. The method according to claim 1, wherein after the step of polishing the opposing substantially planar surfaces, the conformal coating of silica-alumina remains along the at least one edge of the glass blank.

16. The method according to claim 15, wherein the at least one edge of the glass blank comprises one or more cracks, and wherein the conformal coating of silica-alumina along the at least one edge of the glass blank penetrates the one or more cracks.

17. The method according to claim 1, wherein the glass blank comprises an annulus, and wherein the at least one edge comprises an inner edge of the annulus and an outer edge of the annulus.

18. A method for forming a plurality of glass substrates, comprising the steps of:
    forming a plurality of glass blanks, each glass blank having opposing substantially planar surfaces and at least one edge;

coating the plurality of glass blanks in silica-alumina nanoparticles, the silica-alumina nanoparticles comprising an inner core of silica with an outer shell of alumina;

stacking the plurality of coated glass blanks directly upon one another;

annealing the stacked plurality of coated glass blanks to form a conformal coating of silica-alumina around each glass blank; and polishing each glass blank to remove the conformal coating of silica-alumina from the opposing substantially planar surfaces thereof and to remove a portion of the glass substrate from each of the opposing substantially planar surfaces.

\* \* \* \* \*